United States Patent [19]

Scragg et al.

[11] 4,233,101
[45] Nov. 11, 1980

[54] METHOD OF LINING A PIPE

[76] Inventors: Frederick Scragg, Loge du Tisseraud, Trinity; Peter Marshman, Medlers, Pont Marquet, St. Brelade, both of Channel Islands

[21] Appl. No.: 41,784

[22] Filed: May 23, 1979

Related U.S. Application Data

[63] Continuation of Ser. No. 859,232, Dec. 9, 1977, abandoned.

[30] Foreign Application Priority Data

Dec. 9, 1976 [GB] United Kingdom .............. 51392/76
Jan. 7, 1977 [GB] United Kingdom ................. 480/77
May 17, 1977 [GB] United Kingdom .............. 20615/77

[51] Int. Cl.³ .......................................... B29C 17/07
[52] U.S. Cl. .................................. 156/287; 156/272; 156/294; 156/324.4
[58] Field of Search ............... 156/286, 287, 294, 330, 156/272, 309, 74, 499; 219/10.69

[56] References Cited

U.S. PATENT DOCUMENTS

| | | | |
|---|---|---|---|
| 2,417,881 | 3/1947 | Munger | 156/287 |
| 2,440,725 | 5/1948 | Munger | 156/287 |
| 2,911,510 | 11/1959 | McNulty | 219/10.69 |
| 2,951,004 | 8/1960 | Martin et al. | 156/309 |
| 3,511,734 | 5/1970 | Darrow | 156/287 |
| 3,784,433 | 1/1974 | Garnish et al. | 156/330 |

Primary Examiner—Jerome W. Massie
Attorney, Agent, or Firm—Fleit & Jacobson

[57] ABSTRACT

A method and apparatus for lining a pipe, e.g. an aluminium pipe, with a thermoplastic material, in which either the inner surface of the pipe or the external surface of a tube of thermoplastic material is coated with an adhesive layer, the tube is inserted in the pipe, a purely radial force is applied to press the plastic tube against the inner surface of the pipe, and axially progressive heating is applied to render the thermoplastic material into a plastic state.

7 Claims, 5 Drawing Figures

METHOD OF LINING A PIPE

This is a continuation of application Ser. No. 859,232, filed Dec. 9, 1977, now abandoned.

The present invention relates to a method of lining a pipe.

Various methods of lining pipes have been proposed previously, including the steps of applying a layer of thermoplastic material to the inner surface of a pipe and subsequently forcing the thermoplastic material against the inner surface of the pipe by mechanical or pneumatic means. A further method includes extruding an inner lining thermoplastic pipe from a conventional extruder and drawing it, that is stretching it, as it is extruded. The pipe is then allowed to cool and is inserted into the pipe to be lined which is subsequently heated so that the inner thermoplastic lining pipe contracts axially and expands radially. In this method the thermoplastic layer is held against the pipe by the radial force with or without the application of a suitable adhesive. This method has some advantages over the prior known methods, but it suffers the disadvantage that it cannot be used commercially in that the pipes produced are excessively expensive and the bond between the metal or other pipe and the lining pipe is not adequate.

It is now proposed, according to the present invention, to provide a method of lining a pipe comprising applying an adhesive layer to the inner surface of the pipe, inserting in the pipe a film of thermoplastic material to overlie the adhesive layer on the inner surface of the pipe, applying a uniform, purely radial force to said thermoplastic film and heating the assembly to render the thermoplastic film into a plastic state.

In the present invention, the term "film" is used to describe either a flaccid uniform thickness sheet or tube of material, or a semi-rigid or rigid sheet of material of any suitable thickness. In certain circumstances the film can have projections on its inner face to disturb the flow of fluid in the tube. The term "pipe" is used to describe the outer rigid member and the term "tube" the lining thereof.

In an alternative method according to the invention, a film of thermoplastic material is coated on one surface with an adhesive, the thermoplastic film is formed into a tubular film with the adhesive on the exterior, and is inserted into the pipe to be lined, and a uniform purely radial force is applied to the thermoplastic film and the assembly is then heated to render the thermoplastic film into a plastic state.

With the method according to the invention, it is possible to produce a firm bond between the pipe and the film and the film may be of very small thickness, so that the cost of the lined pipe is not excessive.

In either of the above proposed methods, it is advantageous that the purely radial force is produced by pressure differential between the inner surface and the outer surface of the film. In order to ensure even heating around the periphery, it is advantageous that the pipe be rotated about its axis. The film will then be further urged against the pipe in a purely radial manner by centrifugal force.

It is contemplated that the purely radial force could be provided by other means although it is important that this force should be uniform along the length of the pipe. The advantage of having a purely radial force is that there is no tendency at all to stretch or draw the thermoplastic film in an axial or circumferential sense. If there were any tendency to draw the film then the wall thickness could be reduced in certain areas and indeed the film could form with perforations therein. Unless a substantially uniform thickness of film is applied to the inner wall of the pipe, the ability to provide a satisfactory corrosion resistance layer could be reduced.

When the film is in its plastic state, the gas which is located between the film and the pipe can readily be urged axially from the space between the pipe and the film. Thus, it is advantageous that the heating to render the pipe in its plastic state be arranged to take place in an axially progressive manner. Thus the film becomes plastic itself in an axially progressive manner thus urging the gases axially along the inner wall of the pipe.

According to a preferred method of carrying out the invention, the heating is therefore effected by relative axial displacement between the pipe and the source of heat.

Advantageously the tube is arranged so that it is initially secured to the pipe and one end thereof, e.g. by securing it to the outer surface of the pipe. The tube is then passed axially within the pipe and a pressure differential is induced either by applying a positive pressure within the tube at the one axial end of the pipe, or by applying a suction at the other axial end of the pipe. The effect of the pressure differential is to cause a slight circumferential stretching of the film of the tube due to the radial force applied. When the axially progressive heating is applied the circumferential stretched film relaxes slightly and this produces an annulus of gas which is thus axially progressed by the heat along the pipe.

If a tube of film is used, as opposed to a sheet, the external diameter of the tube should be as close as possible to the internal diameter of the pipe. If this is not practicable the tube should be made slightly smaller so that the above stretching does occur and the axially progressive heating will induce the relaxing of the film to produce the annulus of gas and thereby ensure the purging of all gas from between the pipe and tube.

Desirably, the adhesive is heat activated, and, for example, it may be suspended in a solvent carrier, so as to facilitate the application of the adhesive to the film or to the pipe. In this case, the solvent is preferably evaporated by elevating the temperature of the film, and/or the pipe, prior to applying force to the film to cause the latter to engage the interior wall of the pipe.

Many different ways of applying heat are contemplated, according to the invention. One method of applying the heat is to arrange to move the pipe relative to a series of gas or similar jets playing on the outer surface of the pipe. However, preferably the heating is effected by induction heating of the pipe. Advantageously two induction heating annular electrodes are arranged one axially displaced from the other. The first heater will render the thermoplastic film into a plastic state and the second heater will actuate the adhesive. By this means, any air which is entrapped between the film and the pipe is discharged in an axial direction.

Desirably the heat is applied from one end of the pipe to the other, although it is contemplated that the heat could be applied from an intermediate point towards each end, or alternatively from the ends towards an intermediate point, in which case it will be necessary to provide some sort of aperture in the wall of the pipe at the intermediate point for the escape of any entrapped air or other gases.

It will be appreciated that if a heat activated type adhesive is utilized, the adhesive itself does not get into an adhesive state until the temperature rises to a suitable value. By arranging for this value to be substantially the same as the value at which the plastics material itself becomes molten, this has the advantage of ensuring that the adhesive itself is not tacky or activated until after the air has been expelled during the period when the thermoplastic film is in a plastic state.

The invention also relates to an apparatus for lining a pipe, said apparatus comprising means for rotating a pipe provided on its inner surface with a tubular thermoplastic material, about its longitudinal axis, and means for progressively heating the pipe and/or film to a temperature such as to render the outer surface of the film at least in a plastic state.

In a preferred construction of apparatus according to the invention, there is provided a series of rollers rotatable in the same direction about two parallel axes, to support and rotate a pipe in the opposite direction about its longitudinal axis, means to feed the pipe axially along said rollers, two axially spaced radio frequency heaters, means to control the heating of said heaters whereby the upstream one of said heaters can heat the pipe to render the thermoplastic material in a plastic state, and means to control the heating of the downstream one of said heaters to render the outer surface, at least, of said film in a very soft state.

The means to feed the pipe may be in the form of one or more rollers arranged to rotate about a skewed axis to the axis of rotation of the pipe.

In order that the invention may more readily be understood, the following description is given, merely by way of example, reference being made to the accompanying drawings, in which.

Figure 1:
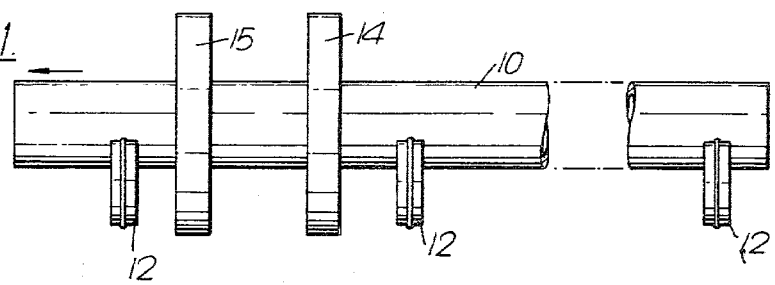
FIG. 1 is a schematic side elevation illustrating one embodiment of apparatus for carrying out the method according to the invention.
Figure 2:
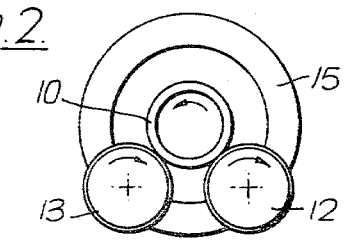
FIG. 2 is an end elevation of the apparatus of FIG. 1.
Figure 3:
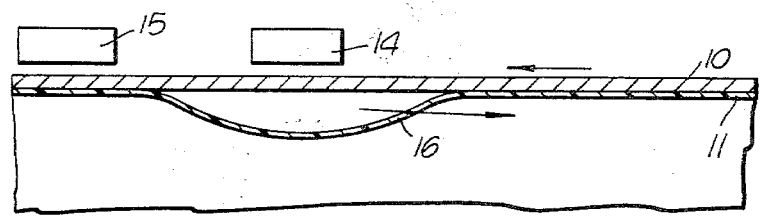
FIG. 3 is a very much enlarged schematic sectional view showing the fixing of the film to the inner wall of the pipe.

A lined pipe 10 is formed by starting with a right cylindrical or otherwise shaped rigid aluminium pipe which has, by way of example, a wall thickness of 1 mm. The pipe is initially cleaned thoroughly and it is then heated to a temperature in excess of 200° C. to drive off any residual evaporable contaminants. The pipe is then cooled, whereafter a heat activated adhesive which is suspended in a solvent carrier is applied to the inner surface of the pipe either by spray or curtain coating. An example of an adhesive which can be used is that manufactured by British Industrial Plastics under their reference number 1607. The viscosity of the adhesive/solvent carrier combination is such that the adhesive is evenly spread over the inside surface of the pipe. The adhesive coating is dried at a room temperature for a short period to allow the solvent to evaporate and the temperature of the coated pipe is then elevated to about 195° C. in order to drive of any remaining solvent, particularly from the adhesive/pipe interface. It is important to eliminate any entrapped solvent in order to prevent inhibition of bond between the adhesive and the pipe at any point. A flexible synthetic resin film 11 (FIG. 3), which is conveniently formed of polyvinylchloride, but which may be formed of any other suitable thermoplastic material, such as polychloroalkene, for example, having a wall thickness of 0.5 mm or less is passed through the aluminium pipe.

Figure 4:
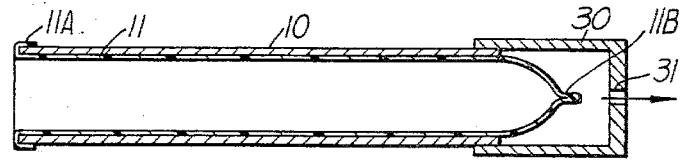
FIGS. 4 and 5 are schematic cross-sections illustrating two methods of inserting the tube within the pipe.

In FIG. 4 one method of inserting the tube 11 into the pipe 10 is illustrated. The tube 11 is cuffed over the lefthand end of the pipe 11 (this has been given the reference numeral 11a), and the tube, which is closed at its righthand end 11b is passed through the pipe 10.

A chamber 30 is fitted, in a sealing-tight manner, about the righthand end of the tube 10, and a suction is applied through a bore 31 therein, at least partially to evacuate the space surrounding the end 11b of the tube. In this way, a pressure differential is applied between the interior surface of the film 11 and its exterior surface, this tends to force the film slightly against the wall of the pipe, and to induce a very small circumferential stretching of the tube.

Figure 5:
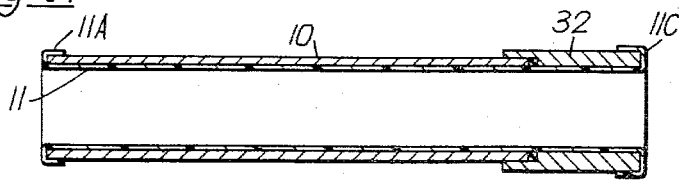

In the arrangement illustrated in FIG. 5, the tube 10 has the end 11a of the tube 11 secured thereto in a similar manner to that described above, but instead of closing the right hand end 11b of the tube, an extension piece 32 is disposed at the righthand end of the pipe 10 and the tube is cuffed around the righthand end of the extension piece at 11c. In both instances, care is taken to try and avoid, if possible, any axial stretching of the plastics material tube.

In FIG. 4, the differential pressure has been applied by sucking around the exterior of the plastic pipe 11. In fact a similar effect could be achieved by applying a positive pressure within the tube, and this could be achieved by having an extension piece at the lefthand end, and cuffing the tube 11 over this extension piece, and arranging for a positive pressure to be induced outside the tube in the extension piece, so that the tube unfolds upon itself within the pipe 10. If this method is used, then the pressure which would be exerted on the interior wall of the pipe would be approximately 1.5 bars above atmospheric pressure.

The pipe is then arranged on a series of roll pairs 12, 13 provided with a friction material type, and these roll pairs are caused to rotate about their parallel longitudinal axes in the same rotational sense. This causes the pipe 10, and its lining 11, to rotate in the opposite rotational sense. Some of the wheels (not shown) may be set at an angle which will not only cause the pipe to rotate about its longitudinal axis, but will also cause it to progress in a direction parallel to its longitudinal axis. The speed of rotation of the driving wheels and the angle at which they are set may be varied to suit the process.

Two induction heater electrodes 14 and 15 are spaced apart in the direction in which the pipe, together with its lining film is caused to progress, this direction being indicated in the drawings by arrows. The heaters are of annular construction and arranged so that the rotating pipe is caused to pass axially therethrough. The first heat source 14 is arranged to elevate the temperature of an adjacent portion of the pipe to about 120° C., while the second heat source 15, located downstream thereof, is arranged to elevate the temperature of an adjacent portion of the pipe to about 195° C. Thus, as the pipe and lining film are caused to progress pass the heat source, two successive temperature gradients are set up in the film. During the linear progression of the pipe and lining film they are also caused to rotate and thus the film is subjected to centrifugal force.

Under the action of the first heating step, that is under the action of heater 14, the film is heated to a temperature whereby the modulus of the film is reduced, so that it comes into the plastic state. As a result of the heater 14, the film, which it will be remembered, was subject to a slight circumferential stretching, returns to its initial diameter, so that it pulls away from the wall of the pipe to form the bulge indicated at 16. Within this bulge, there will, in effect be a slight reduction in pressure which will not be a perfect vacuum, because it will contain any air or evolved gases. The bulge 16 will, of course, be an annular bulge extending around the periphery of the film. Experience has shown, in fact, that the axial length of the bulge increases as the heating progresses along the pipe, this being due to the fact that a greater amount of entrapped or evolved gas is present in the bulge. Since the plastics material has, in effect, been pulled slightly away from the pipe, it is cooled because it is no longer in contact with the heated pipe. The effect of this, is that the film is pulled back against the pipe in very intimate contact therewith, the pressure, whether it be just atmospheric pressure, or additional pressure, within the tube, causing this effect. Furthermore, the gas which is entrapped between the tube and pipe is axially progressed along the inner wall of the pipe.

If the set-up is as shown in FIG. 4, then the gas is extracted by the vacuum applying means. If the set-up is as shown in FIG. 5, then the annular bulge will proceed into the extension piece and will remain therein, so that intimate contact can take place between the film and the whole of the pipe 10 which is being lined. It will be appreciated, that if no extension piece were applied, and the film were cuffed over the end of the pipe itself, then some of the gas would be entrapped at the downstream end of the pipe, that is to say the righthand end as shown in FIGS. 4 and 5.

The centrifugal force caused by the rotation of the pipe also assists in producing the radial force which urges the tube against the pipe.

The adhesive is activated when the temperature is elevated to about 195° C. by the heater 15. By the time the film is passing underneath the heater there will be no bulge which is, in effect, moving in the direction of the double headed arrow.

At the same time, the outer surface, at least, of the lining film becomes molten. The centrifugal force keeps the molten material against the activated adhesive, so that, upon cooling, the bond is completed.

It will be appreciated that the force on the lining film is substantially radial only. Thus, there is no tendency to stretch the film axially which could damage the film and cause irregularities in wall thickness thereof.

When the bond is completed between the film and pipe, the resultant composite structure can then be sectioned or deformed at any point and exhibit a substantially perfect bond, so that the lined pipe can be cut at any point with little or no risk of the lining separating from the pipe. We claim:

1. A method of lining a pipe comprising applying a nontacky adhesive layer to the inner surface of the pipe, the adhesive being capable of being heat activated at a first temperature value, to cause it to become tacky, inserting in the pipe a film of thermoplastic material to overlie the nontacky adhesive layer on the inner surface of the pipe, applying a uniform purely radial force to said thermoplastic material, while the adhesive is still nontacky, heating the assembly in an axially progressive manner, by affecting relative axial displacement between the pipe and a source of heat to raise the temperature to a value below said first temperature value to render the thermoplastic film to a plastic state and then heating the assembly at least to said first value to activate the adhesive and cause it to adhere to the thermoplastic film.

2. A method according to claim 1, wherein the purely radial force is effected by producing a pressure differential between the inner surface and outer surface of the film.

3. A method according to claim 1, wherein the pipe is rotated about its longitudinal axis during the heating.

4. A method according to claim 1, wherein the heating is applied from one end of the pipe to the other.

5. A method according to claim 1, wherein a further source of heat is provided downstream of said source of heat, said further source of heat being arranged to elevate the temperature of the pipe to said value below said first temperature value to activate the adhesive.

6. A method according to claim 5, wherein two annular heating members are arranged, one axially displaced from the other, the first heater rendering the thermoplastic material into a plastic state, and the second heater activating the adhesive.

7. The method of lining a pipe comprising coating one surface of a film of thermoplastic material with a nontacky adhesive, which is capable of being activated at a first temperature value, to cause it to become tacky, forming the thermoplastic material into a tubular film with the nontacky adhesive on the exterior, inserting the tubular film into the pipe to be lined, applying a purely radial force to the thermoplastic material, while the adhesive is still nontacky, heating the assembly in an axially progressive manner, by affecting relative axial displacement between the pipe and the source of heat to raise the temperature to a value below said first temperature value to render the thermoplastic material into a plastic state and then heating the assembly at least to said first value to activate the adhesive and cause it to adhere to the thermoplastic film.

* * * * *